United States Patent
Martin et al.

(10) Patent No.: US 7,975,628 B2
(45) Date of Patent: Jul. 12, 2011

(54) METHOD FOR SUPPLYING COMBUSTION GAS IN INCINERATION SYSTEMS

(75) Inventors: Johannes Martin, München (DE); Joachim Horn, Lochen (DE); Oliver Gohlke, München (DE)

(73) Assignees: Martin GmbH für Umwelt- und Energietechnik, Munich (DE); Covanta Energy Corporation, Fairfield, NJ (US)

( * ) Notice: Subject to any disclaimer, the term of this patent is extended or adjusted under 35 U.S.C. 154(b) by 0 days.

(21) Appl. No.: 11/707,597

(22) Filed: Feb. 16, 2007

(65) Prior Publication Data
US 2008/0063992 A1    Mar. 13, 2008

(30) Foreign Application Priority Data
Sep. 13, 2006  (DE) .................. 10 2006 043 807

(51) Int. Cl.
F23L 1/00  (2006.01)
F23J 11/00  (2006.01)

(52) U.S. Cl. ........ 110/346; 110/344; 110/348; 110/204; 431/115; 431/116

(58) Field of Classification Search ............. 110/346, 110/341, 235, 248, 342, 345, 210, 214; 431/115, 431/116
See application file for complete search history.

(56) References Cited

U.S. PATENT DOCUMENTS

| | | | |
|---|---|---|---|
| 4,381,718 A * | 5/1983 | Carver et al. ............. | 110/347 |
| 4,838,183 A * | 6/1989 | Tsaveras et al. .......... | 110/190 |
| 5,014,630 A * | 5/1991 | Looker ..................... | 110/194 |
| 5,020,456 A | 6/1991 | Khinkis et al. | |
| 5,205,227 A | 4/1993 | Khinkis et al. | |
| 5,241,916 A | 9/1993 | Martin | |
| 6,336,415 B1 | 1/2002 | Rüegg et al. | |
| 6,952,997 B2 * | 10/2005 | Shimrony et al. ......... | 110/345 |
| 2006/0196400 A1 * | 9/2006 | Martin et al. ............. | 110/341 |

FOREIGN PATENT DOCUMENTS

| | | | |
|---|---|---|---|
| DE | 37 12 039 | | 10/1988 |
| DE | 199 38 269 | | 2/2001 |
| DE | 19938269 | * | 2/2001 |
| EP | 049 8014 B2 | | 8/1992 |
| EP | 1 698 827 | | 9/2006 |
| WO | WO 99/58902 | | 11/1999 |

OTHER PUBLICATIONS

International Search Report of PCT/DE2007/001617.
Russian Office Action (w/English translation) dated Jun. 12, 2010 issued in Russian application No. 2009113620/06.

* cited by examiner

*Primary Examiner* — Steven B McAllister
*Assistant Examiner* — Nikhil Mashruwala
(74) *Attorney, Agent, or Firm* — Collard & Roe, P.C.

(57) ABSTRACT

The combustion system for implementing the process has a combustion grate, hoppers below the combustion grate for supplying primary combustion gas through the grate and nozzles that lead into the furnace above the combustion grate to supply secondary combustion gas. At least one extraction duct for flue gas is provided at the rear end of the furnace above the combustion grate. This duct is connected to the suction side of a fan. The pressure side is connected to nozzles arranged in the upper area of the flue gas pass. The nozzle height allows the flue gases a residence time of at least 1 second after secondary gas is supplied.

10 Claims, 1 Drawing Sheet

METHOD FOR SUPPLYING COMBUSTION GAS IN INCINERATION SYSTEMS

CROSS REFERENCE TO RELATED APPLICATIONS

This application claims priority under 35 U.S.C. §119(a)-(d) from German Patent Application No. 10 2006 043 807.8 filed on Sep. 13, 2006, the subject matter of which is incorporated herein by reference in full.

FIELD OF THE INVENTION

The invention relates to a method for combustion control in incineration systems in which primary combustion gas is passed through the fuel and secondary combustion gas is introduced above the fuel directly into the flue gas flow, and in which some of the flue gases are drawn off the flue gas flow in the rear combustion area and are returned to the combustion process as internally recirculated gas.

BACKGROUND OF THE INVENTION

A method of this kind is known from EP 0498014 B 2. In this case, the method was used to reduce the flue gas flow but did not deal with the possibilities for reducing pollutant emissions.

It is a known fact that a part of the nitrogen in the waste reacts during combustion to become $NO/NO_2$, which leaves the combustion process with the flue gases and must undergo complex treatment to prevent its being released into the environment as a pollutant ($NO_x$/nitrogen oxide). Another part of the nitrogen in the combustion process reacts to become $NH_2$ or CN compounds/radicals. These intermediate products are instable at high temperatures and undergo further reactions. Since the intermediate products/radicals are capable of reducing already formed $NO/NO_2$ to $N_2$, it makes sense to design combustion control to use this effect as a denitrification process inherent in the system.

SUMMARY OF THE INVENTION

In conformity with the current state-of-the-art, combustion control in the furnaces of combustion systems is designed in such a way that above the combustion grate and after primary combustion has taken place on the grate, a secondary combustion zone is formed immediately as a zone of high turbulence to which ambient air or recirculated gas is supplied and in which all combustible gas components (gases and solid particles) that are still present combust as completely as possible. The process is controlled in such a way that the combustion reactions take place under overstoichiometric conditions, generally with an excess air rate of 1.7 to 2.2. Secondary air and/or recirculated flue gas is supplied to the post combustion area with a high impulse and strong mixing effect which results in early destruction, i.e. oxidation, of the above intermediate products ($NH_2$— or CN-compounds), which consequently are no longer available to react with the already formed nitrogen oxides ($NO_x$). The recirculated flue gas is generally drawn off after it has passed through a steam boiler and usually also a flue gas cleaning system, as a result of which this gas flow can be called "externally recirculated gas".

If the system is operating at a significantly substoichiometric level for primary combustion, complete burnout of solid fuel cannot always be guaranteed, in particular when using fuels with heating values and combustion behavior that fluctuate severely. Operation under virtually stoichiometric conditions for secondary combustion, i.e. excess air $\leq 1.6$ leads to uncombusted gas components and, as a result, undesirable emissions to the environment and corrosion in the downstream steam generator.

The object of the invention is to control the combustion process in such a way that optimum burnout of solid fuel and flue gases is achieved, that nitrogen oxide formation/emission is minimized as far as possible, and that stable operation with low excess air rates (excess air =1.3 to 1.5) and low flue gas volumes are achieved.

According to the invention, this object is achieved using a process of the kind described above, in that the sum of the primary combustion gas flow and secondary combustion gas flow is reduced until essentially stoichiometric or virtually stoichiometric reaction conditions are achieved for the flue gas flow directly above the secondary combustion level, and that internally recirculated gas is supplied to a tertiary combustion area in which the flue gases achieve a residence time of at least one second after secondary combustion gas is introduced.

Primary combustion gas is in general understood to be ambient air. In some special cases, however, the ambient air may be enriched with oxygen.

BRIEF DESCRIPTION OF THE DRAWINGS

A more complete understanding of the present invention and advantages thereof may be acquired by referring to the following description taken in conjunction with the accompanying drawing in which like reference numbers indicate like features, and wherein.

DETAILED DESCRIPTION OF THE PREFERRED EMBODIMENTS

Figure 1:
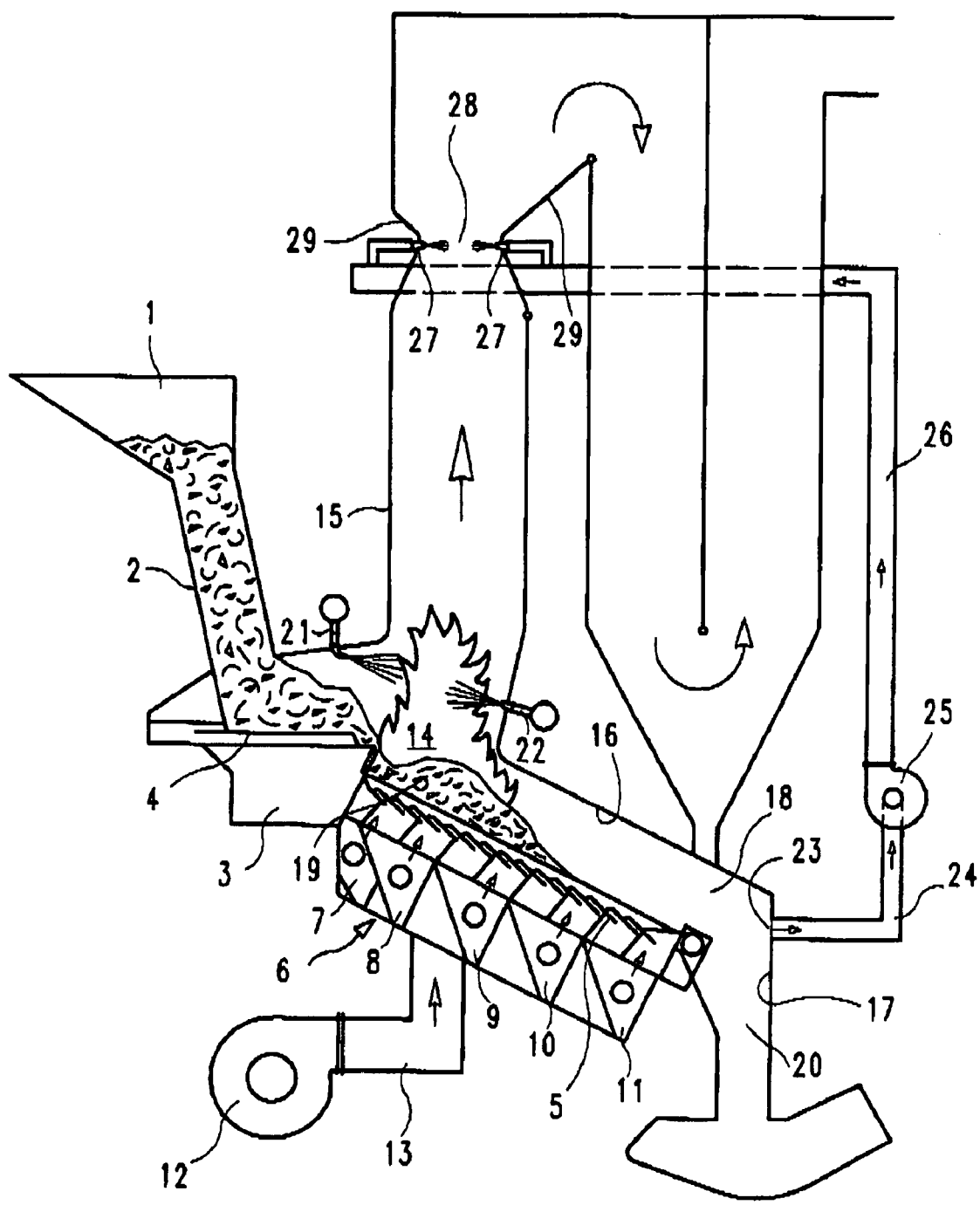
FIG. 1 is a high-level schematic diagram of an incineration system with supplied combustion gas in accordance with embodiments of the present invention.

As opposed to the conventional operating mode of combustion systems, the supply of primary combustion gas remains unchanged at an approximately stoichiometric flow in order to optimize burnout of the solid fuel. To still maintain a low excess air level for the entire combustion process and to allow the necessary amount of secondary combustion gas flow for mixing/homogenizing the combustion gas, the sum of the primary gas flow and secondary gas flow is reduced until essentially stoichiometric or virtually stoichiometric reaction conditions are achieved. In practice, this means that the gases formed during primary combustion that still contain significant amounts of unreacted oxygen are prevented from entering the secondary combustion zone. The gases in question are those that arise in the rear combustion grate area. There, primary combustion gas is mainly supplied to ensure complete burnout of the solid fuel and to cool the combustion residues (bottom ash). The resulting flue gas flow is therefore characterized by a merely minimally reduced oxygen content compared to that of the primary combustion gas or ambient air.

This gas flow is extracted by suction from the rear combustion chamber area, thereby preventing it from entering the secondary combustion zone. The gas is referred to as internally recirculated gas and, according to the invention, is returned to the upper furnace area, i.e. clearly after the secondary combustion zone. In this area, referred to as the tertiary combustion area, the flue gases have a residence time of at least one second after secondary combustion gas is supplied, advantageously as much as two seconds. With the method of the present invention, only enough oxygen in the form of secondary combustion gas is supplied to the secondary combustion area as is needed to achieve good mixing or homogenization of the flue gas flow.

The secondary combustion gas can be ambient air, ambient air and externally recirculated gas, or only externally recirculated gas that has passed through a steam boiler and possibly a flue gas cleaning system.

By reducing the primary combustion gas flow in the area of stoichiometric reaction conditions, preferably in areas with slightly substoichiometric conditions, less $NO_x$ is generated but more NH and CN compounds are formed. If a secondary combustion zone with reduced effectiveness is introduced to mix and homogenize the flue gas flow without causing intense post combustion of all NH and CN compounds, these compounds have the opportunity to reduce $NO_x$ to $N_2$. Experience shows that a residence time in the region of 1-2 seconds is adequate for good reaction efficiency. In particular, the object of keeping nitrogen oxide levels low is well met by supplying externally recirculated gas to the secondary combustion area. However, it must then be accepted that complete flue gas burnout, and in particular complete destruction of all noxious gases cannot always be ensured in this case, as a result of which an additional reaction area must be created.

To achieve this goal, a tertiary combustion area is formed after the secondary combustion area according to the invention, and complete gas burnout and destruction of any organic compounds that may still be present occurs. According to the invention, the required turbulence and necessary excess air are provided by internally recirculated gas. The internally recirculated gas is the gas that was drawn off from the rear grate area and prevented from passing on to the secondary combustion area. The total excess air for the combustion process is not increased any further, thereby achieving the object of implementing the combustion process with low excess air rates. Moreover, recirculation of the internally recirculated gas means that no additional tertiary combustion air in the form of ambient air is required, thereby keeping the flue gas volume as low as possible.

In a further arrangement of the invention, a chemical agent for reducing $NO_x$ can be injected into the flue gas flow of the combustion plant where tertiary combustion gas is supplied to make further reductions in $NO_x$ content possible and to capture the $NO_x$ molecules that have not yet been reduced at the start of the tertiary combustion area.

In a further arrangement of the invention, the chemical agent for reducing $NO_x$ can also be added to the tertiary combustion gas, i.e. the internally recirculated gas. In this case, the turbulence-creating effect of supplying tertiary combustion gas can also be used in intimately mixing the chemical agent with the flue gas flow.

These agents are known from the selective non-catalytic reduction process (SNCR); urea or aqueous ammonia are preferably used.

It is furthermore advantageous when increased flue gas turbulence is generated in the tertiary combustion area or above same, i.e. above the point at which internally recirculated flue gas is introduced. This can be achieved not only by the turbulence arising from introduction of the internally recirculated flue gas, but also for example by reducing the cross section of the flue gas pass in the furnace at the point at which internally recirculated gas is introduced or above same, or by using installations for increasing turbulence in this area.

The invention also relates to a combustion system for implementing the described method.

The invention is explained in more detail below by an example of the arrangement in the drawing (FIG. 1).

This drawing is a schematic representation in the form of a longitudinal section through a combustion system. While a particular combustion system is depicted in FIG. 1 and described below, it should be appreciated that the principles of the present invention may be adapted to a variety of incineration system to achieve desired $NO_x$ reductions.

As can be seen in the drawing, the combustion system has a feed hopper 1 followed by a feed chute 2 for supplying the fuel to a feed table 3, on which feed rams 4 that can be moved to and fro are provided to convey the fuel arriving from the feed chute 2 onto a combustion grate 5 on which combustion of the fuel takes place. Whether the grate is sloping or is horizontally arranged and which principle is applied is immaterial.

Below the combustion grate 5 is arranged a device, denoted in its totality by 6, that supplies primary combustion air and that can consist of several hoppers 7 to 11 into which primary combustion air is introduced via a duct 13 by means of a fan 12. Through the arrangement of the chambers 7 to 11, the combustion grate is divided into several undergrate air zones so that the primary combustion air can be adjusted to different settings according to the requirements on the combustion grate.

Above the combustion grate 5 is a furnace 14 which leads into a flue gas pass 15 which is followed by components that are not shown, such as a heat recovery boiler and a flue gas cleaning system. The rear area of the furnace 14 is delimited by a roof 16, a rear wall 17 and side walls 18. Combustion of the fuel denoted by 19 takes place on the front part of the combustion grate 5 above which the flue gas pass 15 is located. Most of the primary combustion air is introduced into this area via the chambers 7, 8 and 9. On the rear area of the combustion grate 5 there is only predominantly burnt-out fuel, or bottom ash, and primary combustion air is introduced into this area via the chambers 10 and 11 primarily for cooling purposes and to facilitate residual burnout of the bottom ash.

The burnt-out fuel then falls into a discharger 20 at the end of the combustion grate 5. Nozzles 21 and 22 are provided in the area of the flue gas pass 15 to supply secondary combustion gas to the rising flue gas, thereby mixing the flue gas flow and facilitating post combustion of the combustible portion remaining in the flue gas.

To implement the process according to the invention, flue gas is extracted from the rear furnace area delimited by the roof 16, the rear wall 17 and the side walls 18. This gas is referred to as internally recirculated gas.

A suction opening 23 is provided in the rear wall 17 in the exemplary embodiment. This opening 23 is connected to the suction side of a fan 25 so that flue gas can be extracted. A duct 26 is connected to the pressure side of the fan and supplies the extracted flue gas to the tertiary combustion area 28 through nozzles 27 in the upper area of the flue gas pass 15. In this area, the flue gas has a residence time of at least 1 second or advantageously even at least 2 seconds after leaving the secondary combustion area.

In the tertiary combustion area 28 or above same, the flue gas pass is significantly constricted to increase turbulence and the mixing effect of the flue gas flow in the pass 15. The nozzles 27 are located in this constricted area. However, other fittings or elements 29 can also be provided to disrupt the gas flow and thereby generate turbulence.

The invention claimed is:

1. Method for combustion control in incineration systems, in which a fuel is conveyed to an incineration grate, primary combustion gas is passed through the fuel, and secondary combustion gas comprising ambient air without any additional fuel is introduced through nozzles directly into a waste gas stream, above the fuel, and in which part of the waste gas stream is drawn out of the waste gas stream in a rear incineration region and passed back into the combustion process as internal recirculation gas, wherein a sum of primary combustion gas amount and secondary combustion gas amount is lowered to such an extent that essentially stoichiometric reaction conditions are achieved, with reference to the waste gas stream directly above a secondary combustion gas plane and below a tertiary combustion region, without introducing any additional fuel and that said internal recirculation gas is prevented from entering a primary combustion region and a secondary combustion region and is passed into the tertiary combustion region, in which the waste gases have a dwell time of at least one second after introduction of the secondary combustion gas.

2. Method according to claim 1, wherein the secondary combustion gas comprises ambient air and external recirculation gas that has passed through a steam generator.

3. Method according to claim 1, wherein the secondary combustion gas comprises external recirculation gas that has passed through a waste gas purification system.

4. Method according to claim 1, wherein a chemical agent for nitrogen oxide reduction is introduced in the region of the feed of internal recirculation gas, i.e. in the tertiary combustion region, through nozzles.

5. Method according to claim 4, wherein a chemical agent for nitrogen oxide reduction is mixed into the tertiary combustion gas, i.e. the internal recirculation gas.

6. Method according to claim 4, wherein urea or ammonia is used as the chemical agent.

7. Method according to claim 1, wherein an increased turbulence of the waste gases is produced in the tertiary combustion region or above same, i.e. above the introduction of internal recirculation gas.

8. Incineration system for carrying out the method according to claim 1, having an incineration grate for receiving a fuel, a device below the incineration grate for feeding primary combustion air in through the incineration grate, as well as having nozzles that open into an incineration chamber, above the incineration grate, for feeding in secondary combustion gas comprising ambient air without any additional fuel, whereby at least one draw-off line for waste gas is provided in the incineration chamber, above the incineration grate, and in which part of the waste gas stream is drawn out of the waste gas stream in the rear incineration region and passed back into the combustion process as internal recirculation gas, said internal recirculation gas being prevented from entering a primary combustion region and a secondary combustion region and being passed to a tertiary combustion region, wherein the sum of primary combustion air amount and secondary combustion gas amount is lowered to such an extent that essentially stoichiometric reaction conditions are achieved, with reference to the waste gas stream directly above a secondary combustion gas plane and below the tertiary combustion region, without introducing any additional fuel and wherein a suction line of a fan is exclusively connected with a draw-off line, a pressure side of which is connected with nozzles in said tertiary combustion region, by way of a line, which are provided at a height above the incineration grate at which the waste gases have a dwell time of at least one second after introduction of the secondary combustion gas.

9. Incineration system according to claim 8, wherein a waste gas train of the incineration chamber is narrowed in the tertiary combustion region or above same, in order to produce turbulence.

10. Incineration system according to claim 8, wherein installations that hinder the waste gas stream are provided in a waste gas train of the incineration chamber, in the tertiary combustion region or above same, in order to produce turbulence.

* * * * *